J. A. REYNOLDS.
ATTACHMENT FOR CORN HARVESTERS.
APPLICATION FILED AUG. 25, 1911.
1,045,324.
Patented Nov. 26, 1912.
4 SHEETS—SHEET 1.
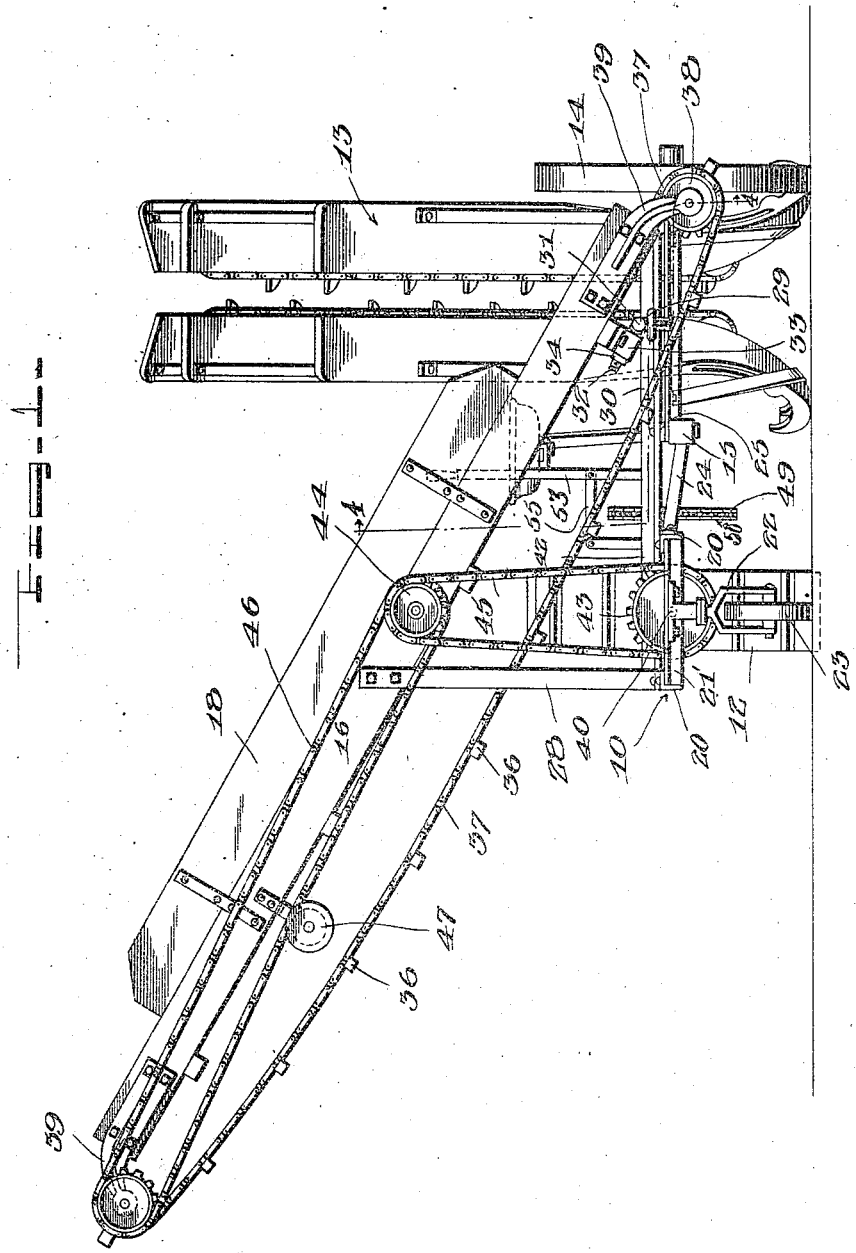
Witnesses
Inventor
J. A. Reynolds
By
Attorneys

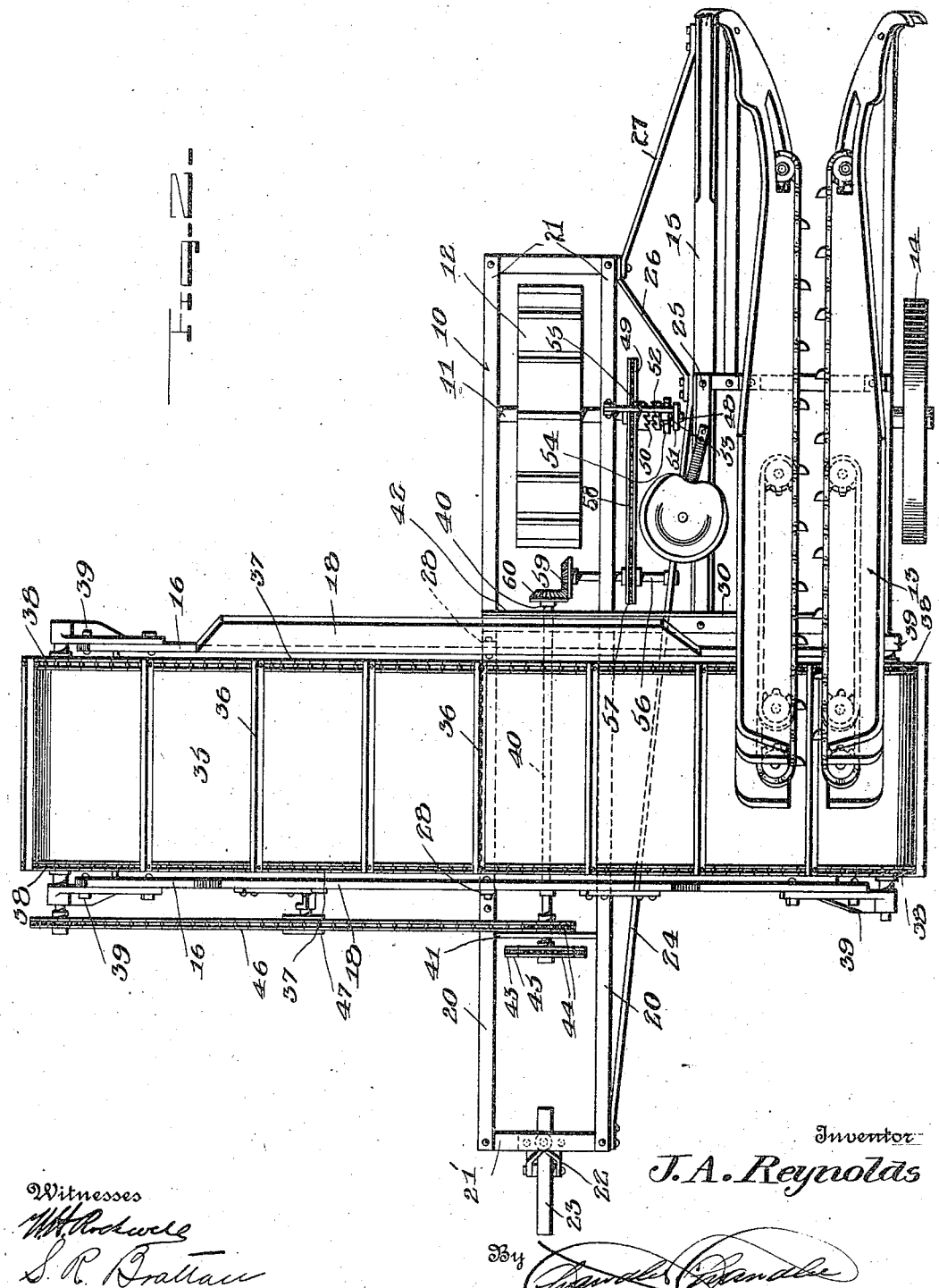

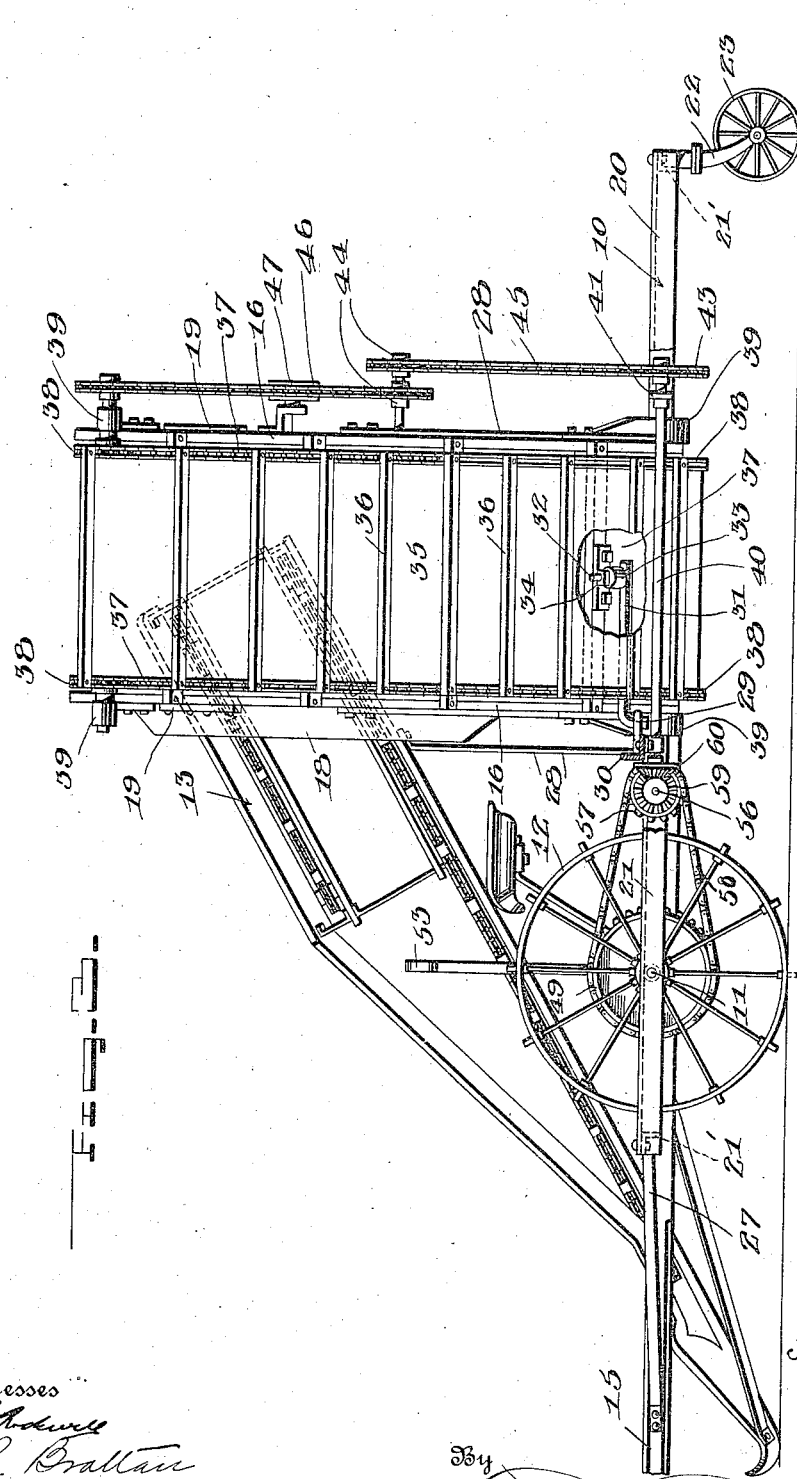

J. A. REYNOLDS.
ATTACHMENT FOR CORN HARVESTERS.
APPLICATION FILED AUG. 25, 1911.
1,045,324.
Patented Nov. 26, 1912.
4 SHEETS—SHEET 4.
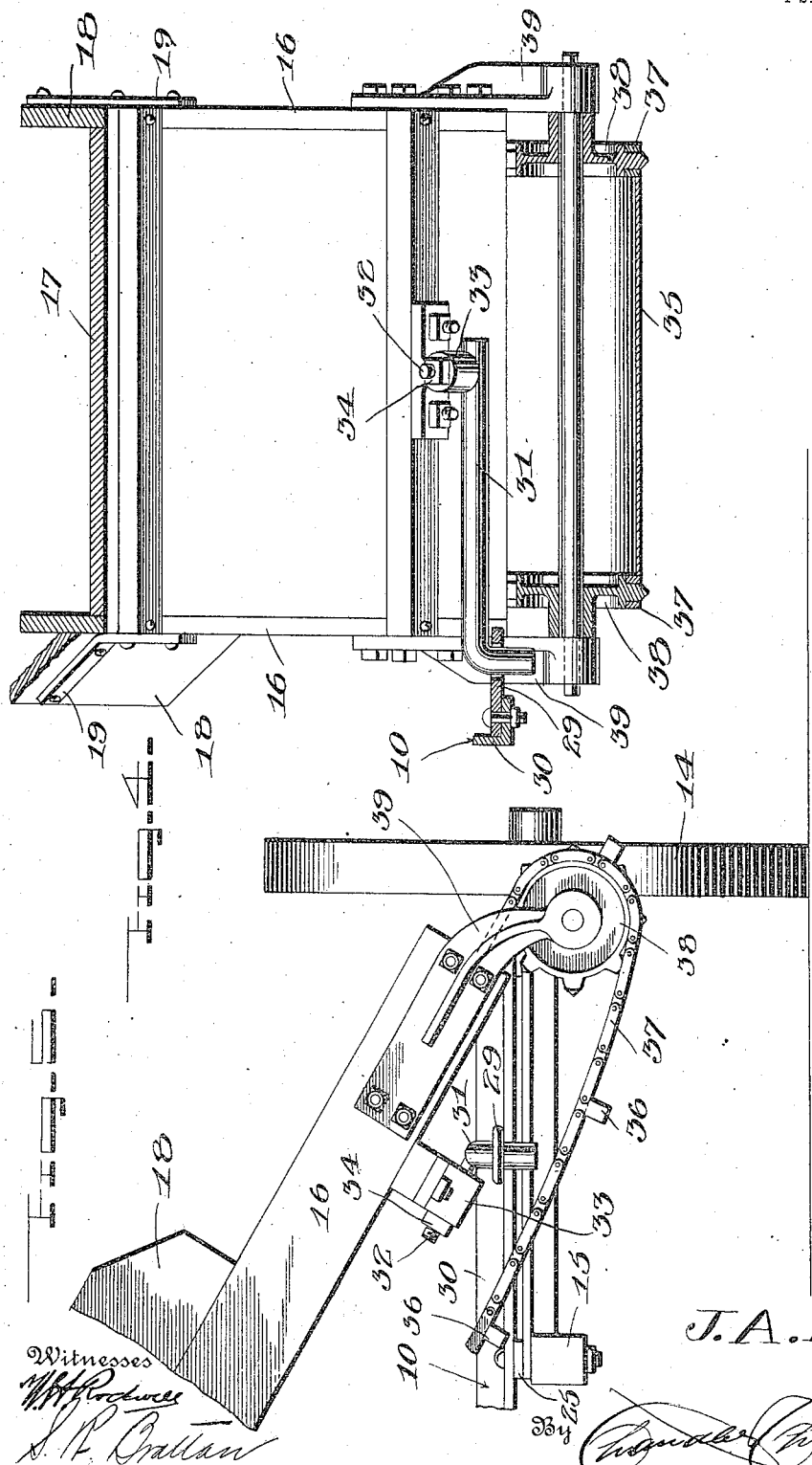

UNITED STATES PATENT OFFICE.

JOHN A. REYNOLDS, OF WINCHESTER, KANSAS.

ATTACHMENT FOR CORN-HARVESTERS.

1,045,324.  Specification of Letters Patent.  Patented Nov. 26, 1912.

Application filed August 25, 1911. Serial No. 645,910.

*To all whom it may concern:*

Be it known that I, JOHN A. REYNOLDS, a citizen of the United States, residing at Winchester, in the county of Jefferson, State of Kansas, have invented certain new and useful Improvements in Attachments for Corn-Harvesters; and I do hereby declare the following to be a full, clear, and exact description of the invention, such as will enable others skilled in the art to which it appertains to make and use the same.

This invention relates to corn harvesters, and has for an object to provide a novel endless elevator which will be driven direct from the harvester ground wheel; and further will be so constructed as to be applicable to many of the harvesters now in general use without extensive alterations to the harvester.

A further object of the invention is to so connect the elevator to the harvester frame as to permit of the independent vibration of both the harvester and elevator on uneven ground.

A still further object of the invention is to provide the elevator with a novel combined brace and draft rod.

A final object of the invention is to generally simplify and improve endless elevator attachments for harvesters.

With the above objects in view the invention consists in certain novel details of construction, and combination of parts, hereinafter fully described and claimed, it being understood that various modifications may be made in the minor details of construction within the scope of the appended claim.

In the accompanying drawings forming part of this specification:—Figure 1 is a rear elevation of the harvester with my improved endless elevator attached thereto. Fig. 2 is a plan view of the harvester and elevator. Fig. 3 is a side elevation of the harvester and elevator. Fig. 4 is an enlarged vertical sectional view taken on the line 4—4 Fig. 1. Fig. 5 is a fragmentary rear elevation showing the manner of connecting the elevator to the harvester frame.

Referring now to the drawing in which like characters of reference designate similar parts, a conventional harvester is shown including a main frame 10 upon which is suitably journaled an axle 11 which carries the main wheel 12. The gathering mechanism 13 is suitably supported on the frame, and a grain wheel 14 carried by the frame outside of the gathering mechanism coöperates with the main wheel in supporting the frame. A draft tongue 15 is secured to the frame.

The endless elevator comprising the subject-matter of this invention is designed to be supported in the rear of the frame and has its lower or intake end extending below the gathering mechanism receiving discharged bundles of corn therefrom. The endless elevator comprises a trough formed of parallel side rails 16 connected at their lower edges by a floor or bottom 17, side boards 18 being secured by straps or the like 19 to the upper edges of the side rails. Within this trough an endless web hereinafter more fully described travels upwardly.

To support the trough in inclined position, parallel extensions 20 are arranged to form continuations of the longitudinal bars 21 of the harvester frame which latter named bars are arranged on opposite sides of the main wheel and spaced approximately a foot or more apart. The extensions 20 are connected at their rear ends by a cross bar 21′ from which a suitable shaft hanger 22 depends and supports a swivel ground wheel 23.

An inclined brace 24 is connected at one end to the rear end of the innermost extension and at its opposite end to one of the longitudinal bars 25 of the harvester. A similar inclined brace bar 26 is connected to the longitudinal bar 25 and to the forward end of the bar 21. A third inclined brace bar 27 is connected at its opposite ends to the bar 21 and to the draft tongue 15. It will thus be seen that the brace bars 24, 26 and 27 are arranged in the form of a Z and rigidly anchor the elevator supporting frame against displacement from the harvester frame, and further the bar 27 performs the function of a draft bar which coacts with the harvester draft tongue.

A pair of parallel posts 28 are secured at their lower ends to the outermost extension 20 and at their upper ends to the bottom of the trough and form supporting legs for the trough. To secure the lower end of the trough to the harvester frame, an integral strap loop 29 is arranged on the rearmost bar 30 of the frame and an L-shaped bracket 31 has one of its arms inserted downwardly in this loop, the other arm being equipped with a laterally projecting pin 32 which is engaged in a strap bracket 33 fixed to the underneath face of the trough floor. The pin 32 is threaded at its outer end and equipped with a nut 34 which bears against the strap bracket 33 and rigidly secures the L-shaped bracket 31 to the trough. The L-shaped bracket loosely fits in the loop 29, so that upon travel of the machine over uneven ground, the lower end of the trough may have slight vertical play while at the same time being held to the harvester frame. The object of this is to permit of the trough vibrating independently of the harvester frame so that racking of the elevator will be reduced to a minimum.

The elevator endless web is formed of an endless length of canvas or similar material 35 which is secured to transverse flights 36, the opposite ends of these flights being connected to parallel link chains 37, these chains being trained over spur gears 38 journaled in suitable brackets 39 secured to the side rails adjacent to the upper and lower ends of the latter. The web travels upwardly within the trough, the flights engaging with the bundles of corn discharged from the gathering mechanism and carrying the bundles to the upper or discharge end of the elevator from whence they gravitate into the receptacle designed for their reception. For actuating the web, a driving shaft 40 is journaled in suitable bearings arranged on a cross bar 41 and on the rear bar 42 of the harvester, this driving shaft extending transversely under the bottom of the trough and being equipped at its outer end with a sprocket gear 43. Arranged on the rear trough side rail above this sprocket gear is a double sprocket gear 44 over one set of teeth of which and the sprocket gear 43 a link chain 45 is trained. Over the other set of teeth of the gear 44 and over one of the gears at the upper end of the harvester frame, which gear it may be said is double or has two sets of teeth, a link chain 46 is trained, idlers 47 being arranged on the trough to maintain this chain taut. During actuation of the driving shaft, the endless web will be actuated, the loaded side of the web traveling upwardly within the trough and the free side of the web traveling downwardly below the bottom of the trough as shown.

For actuating the driving shaft, the axle 11 of the main wheel is formed beyond one of its journal boxes with an extension 48 upon which is loosely mounted a sprocket gear 49, this sprocket gear being equipped with a hub having teeth 50 on its outer face.
A grooved clutch sleeve 51 is slidingly fitted on the extension and is provided with teeth 52 on one face adapted to mesh with the teeth 50 of the sprocket gear. A handle lever 53 is provided at its lower end with a yoke 54 which fits in the groove of the clutch sleeve, this handle lever being fulcrumed on a horizontal arm 55 which is fixed at one end to the bearing of the main wheel as shown in Fig. 2. Upon shifting of this handle lever the sprocket may be made to rotate with the main wheel or to idle as desired. A stub shaft 56 is arranged in suitable bearings formed on the harvester frame bar 21 and on the inclined bar 24 and is equipped with a sprocket gear 57 over which and the sprocket gear 49 a link chain 58 is trained. The shaft 56 is equipped at one end with a bevel gear 59 which meshes with a bevel gear 60 formed on the driving shaft. It is now clear that when the clutch sleeve is thrown in gear with the sprocket 49 that the web of the endless elevator will be actuated, and when the clutch is thrown out of gear the web will be quiescent.
What is claimed, is:—

The combination with a corn harvester including a main frame, a main ground wheel carried thereby, a gathering mechanism, and a grain wheel outside of said gathering mechanism, of a pair of spaced bars carried by said main frame on opposite sides of said main wheel and extending rearwardly beyond said main frame, a pair of posts rising from said bars, an inclined endless elevator trough secured intermediate the ends to the upper ends of said posts and having the lower end extending below and adapted to receive bundles from said gathering mechanism, an endless carrier in said trough, means driven by said ground wheel for actuating said endless carrier, and means for securing the lower end of said trough to the rear bar of said main frame including a ring carried by said rear bar, a bracket extending transversely across the bottom of said trough and having an end bent downward and engaged in said ring, and further having the opposite end bent forwardly and extending along the center of the bottom of the trough, and interlocking means between the last named end of said bracket and said trough bottom, said bracket being adapted to vibrate loosely in said ring.

In testimony whereof, I affix my signature, in presence of two witnesses.

JOHN A. REYNOLDS.

Witnesses:
G. W. McCONNELL,
FRANK E. CLARK.